United States Patent [19]

Sessink

[11] Patent Number: 4,726,073
[45] Date of Patent: Feb. 16, 1988

[54] RECEIVER INCLUDING A MULTIPATH TRANSMISSION DETECTOR

[75] Inventor: Franciscus J. A. M. Sessink, Eindhoven, Netherlands

[73] Assignee: U.S. Philips Corporation, New York, N.Y.

[21] Appl. No.: 913,052

[22] Filed: Sep. 29, 1986

[30] Foreign Application Priority Data

Oct. 2, 1985 [NL] Netherlands .................. 8502695

[51] Int. Cl.⁴ .................................................. H04B 1/10
[52] U.S. Cl. ...................................... 455/205; 455/65; 455/277; 455/278
[58] Field of Search ................. 455/52, 65, 205, 206, 455/277, 278

[56] References Cited

U.S. PATENT DOCUMENTS

| | | | |
|---|---|---|---|
| 4,370,522 | 1/1983 | Takeda et al. | 455/277 |
| 4,499,606 | 2/1985 | Rambo | 455/278 |
| 4,590,615 | 5/1986 | Ohtaki et al. | 455/65 |

FOREIGN PATENT DOCUMENTS 2827572 12/1979 Fed. Rep. of Germany ...... 455/277

*Primary Examiner*—Michael A. Masinick
*Attorney, Agent, or Firm*—Thomas A. Briody; Jack Oisher; William J. Streeter

[57] ABSTRACT

A diversity receiver includes a multipath transmission detector which, upon detecting multipath distortion of a received angle-modulated input signal, switches to an alternative receiving antenna. If such a receiver has high selectivity, the detector may be erroneously triggered by weak received signals. To prevent this, the receiver is provided with a narrow band frequency window circuit which inhibits detection of multipath distortion when the instantaneous frequency of the input signal is outside the frequency window. The frequency window circuit may comprise a level detector connected to the receiver demodulator or connected by a bandpass filter to the R.F. mixer stage of the receiver.

4 Claims, 2 Drawing Figures

RECEIVER INCLUDING A MULTIPATH TRANSMISSION DETECTOR

BACKGROUND OF THE INVENTION

1. Field of the Invention

The invention relates to a receiver including a multipath transmission detector for detecting multipath interference in an angle-modulated input signal.

2. Description of the Related Art

A multipath transmission detector suitable for use in diversity receivers is disclosed in German "Offenlegungsschrift" No. 3,334,735. Receivers of such a type are, for example, in the form of FM-receivers and are generally coupled to a plurality of antennas. Depending on the multipath distortion of an input signal incoming on an antenna, the receiver is switched by means of the multipath transmission detector to one or more other antennas receiving an input signal having a lower multipath distortion. Prior multipath transmission detectors include an AM-detector and/or a frequency interference peak detector. In said German Offenlegungsschrift multipath distortion is detected at the simultaneous occurence of sharp amplitude minima and frequency interference peaks in the received input signal. Prior art receivers including multipath transmission detectors have the disadvantage that in many cases they detect multipath distortion erroneously, in response to which the diversity system of such receivers switches too often, which detrimentally affects the sound quality of these receivers because of the fact that generally audible phase jumps occurs during the change-over actions.

SUMMARY OF THE INVENTION

The invention has for its object to increase the reliability with which multipath distortion is detected in such receivers. According to the invention, the receiver is characterized in that it includes a frequency window circuit having a frequency window the bandwidth of which is located within the bandwidth of the receiver for approving or rejecting, respectively, detection of a multipath transmission signal by the multipath transmission detector, in dependence on whether the instantaneous frequency of the angle-modulated input signal is located or is not located within the window.

An advantage is that distortions which are the result of the narrow receiver bandwidth used especially in car radios, as a result of which multipath distortion is erroneously ascertained in a manner to be described, are no longer detected as multipath distortions. A further advantage is that particularly in those systems which receive weak signals with comparatively much noise the reliability with which multipath distortion is detected can be significantly increased.

A preferred embodiment of the invention which includes a demodulator is characterized in that the frequency window circuit is connected to the demodulator and comprises a level detector, for supplying an enable signal as long as the instantaneous amplitude of the demodulated input signal is located within the values determined by the level detector. It is an advantage that the level detector can be realised in a simple manner and can be implemented in otherwise prior art receivers.

The frequency window circuit may furthermore include a low-pass filter between the demodulator and the level detector.

It is an advantage that because of the consequent attenuation of high-frequency noise components in the demodulated input signal the sensitivity to noise during detection of multipath distortion is decreased, which still further improves the reliability of detection of multipath distortion.

The invention further relates to a multipath transmission detector including a frequency window circuit for use in a receiver according to the invention.

BRIEF DESCRIPTION OF THE DRAWINGS

The invention will now be described in greater detail by way of example with reference to the accompanying drawings. Therein.

DESCRIPTION OF THE PREFERRED EMBODIMENTS

Figure 1:
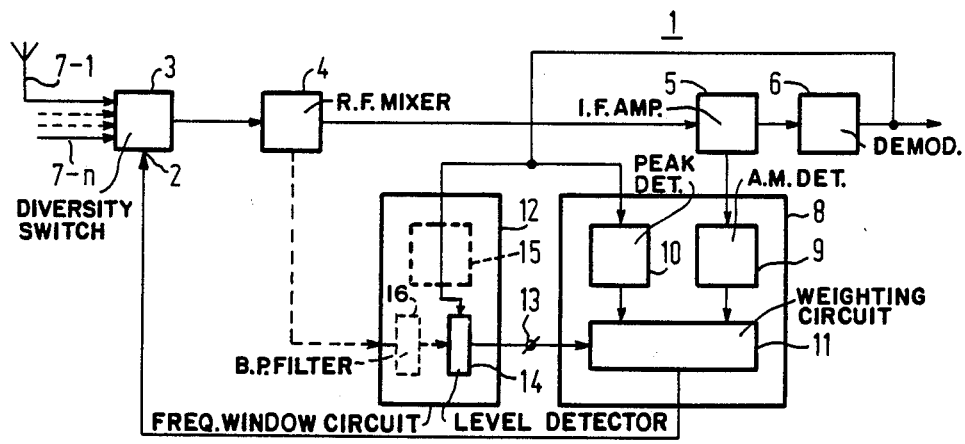
FIG. 1 shows embodiments of the invention.

FIG. 1 shows a receiver 1 which is suitable for receiving angle-modulated input signals such as phase or frequency modulated signals. Receiver 1 may be susceptible to multipath distortions caused by receiving from several directions signals reflected also by obstacles, such as mountains and buildings. In, for example, FM-reception such reflected signals produce distortions in the form of sharp amplitude minima and associated frequency interference peaks, as is described in an article by M. S. Corrington, entitled: "Frequency-Modulation Distortion Caused by Multipath Transmission", published in Proceedings of the IRE, pages 87–891, December 1945.

As will be described hereinafter, multipath distortion is very annoying, particularly in car radios. Diversity receivers having a plurality of antennas have been developed in order to counteract the annoying multipath distortion. In such a diversity receiver a selection is made, on the basis of the multipath distortion detected in the received input signals, of little-distorted input signals originating from one or more antennas, for which pupose a switch must be made from one antenna to another. This switching action is generally audible and must be limited.

The receiver 1 includes a diversity switch 3 having a control input 2, and n inputs and one output, a unit 4 connected to the switch 3 and comprising an RF stage and a mixer stage, an intermediate-frequency amplifier unit 5 connected to this mixer stage and, connected to the intermediate frequency unit, a demodulator 6 which is connected to a loudspeaker (not shown) via, for example, a AF amplifier, also not shown. The diversity switch 3 is connected to n antennas 7-1 to 7-n. In addition, the receiver 1 includes a multipath transmission detector 8 which on detecting multipath distortion applies a control signal to the control input 23 of the diversity switch 3. With the aid of this control signal a switch is made to different combinations of antennas. In this manner the receiver 1 always searches for an input signal of an appropriate quality.

To this end, the multipath detector 8 may comprise an AM detector 9. As in the angle-modulation principle the amplitude of an angle-modulated input signal is constant, multipath distortion which causes the waves received by an antenna or an antenna combination to quench each other by interference, in response to which sharp amplitude minima occur, can be detected. Multipath detector 8 also with such an AM detector may comprise a frequency interference peak detector 10 which by means of amplitude detection, detects frequency interference peaks occuring in the received demodulated signal, produced by the demodulator 6. As both phenomena, i.e. the amplitude minima and the frequency interference peaks can occur simultaneously in pultipath distortion, both AM detector 9 and interference peak detector 10 can be used in the multipath detector 8 and the detection results can be simply combined with the aid of a weighting circuit 11 as shown in FIG. 1 and which is known from German Offenlegungsschrift No. 3,334,735. Depending on the levels of the signals produced by the two detectors 9, 10, the weighting circuit 11 applies, at the simultaneous occurence of these two phenomena, a control signal to the control input 2 in response to which the switch 3 changes-over.

A problem with this arrangement is that when used as a car radio the receiver 1 must be narrow-band receiver. This requirement is more specifically dictated by the fact that the transmit frequencies of different radio transmitters are close to each other. So as to increase the selectivity of the receiver 1, the bandwidth of all the filters, such as the tuning and intermediate frequency filters in the units 4 and 5 of the receiver 1, must be comparatively narrow. This results in a certain degree of distortion because a portion of the side-bands of the angle-modulated signal are not allowed to pass. This causes the signal thus filtered thus not to have a constant amplitude but rather to exhibit amplitude modulation. A further consequence of the narrow-band filtering is that in response to fast phase changes in the amplitude-modulated signal, after demodulation the demodulated signal also contains what are commonly referred to as frequency interference peaks. As a result, particularly for highly modulated signals, multipath detector 8 detects an amplitude minimum and a frequency interference peak and therefore erroneously produces a control signal which results in unwanted switching of the diversity switch 3.

This disadvantage is counteracted by providing the receiver 1 with a frequency window circuit 12 having a frequency window the bandwidth of which is located within the bandwidth of the receiver 1, preferably of the receiver symmetrically around the central frequency bandwidth. It has for its function to determine whether the instantaneous fequency of a received, angle-modulated input signal is within the window bandwith. When this is the case for a received signal, the frequency window circuit 12 produces an enable signal at its output terminal 13 to indicate that any multipath distortion detected by the multipath detector 8 is sufficiently reliable, as this distortion now is not the result of the fact that the receiver 1 is a narrow-band receiver. The output terminal 13 of window circuit 12 is connected to the multipath detector 8.

In a first embodiment the frequency window circuit 12 comprises a bandpass filter 16 and level detector 14, the output of mixer stage 4 being connected to filter 16 in window circuit 12 as shown by the dotted lines in FIG. 1. The enable signal is then generated as long as the instantaneous frequency of the input signal is located within the bandwidth of the frequency window circuit 12. In a second embodiment frequency window circuit 12 comprises only the level detector 14 and the input of frequency window circuit 12 is connected to demodulator 6 and the enable signal is generated as long as the instantaneous amplitude of the demodulated input signal falls within the levels set by a level detector 14 comprised in window circuit 12, since the instantaneous frequency of the received angle-modulated input signal is then located within the bandwidth of the fequency window. The bandwidth of the frequency window circuit 12 may, for example, be approximately 50 kHz, this being located in the centre of the bandwith of the receiver 1, which may be approximately 200 kHz. In such a case the levels determined by the level detector 14 are set such that they correspond to a frequency window having a bandwidth of approximately 50 kHz.

Figure 2:
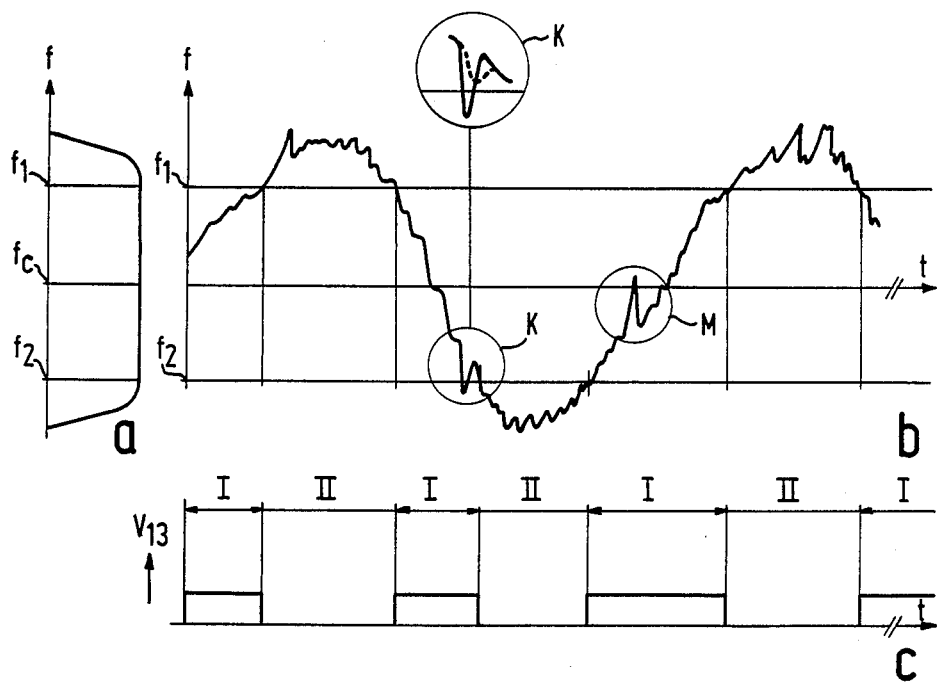
FIG. 2a is a frequency curve representing the bandwidth of the receiver of FIG. 1.
FIG. 2b is a frequency-versus-time curve of the instantaneous frequency of an angle-modulated input signal such as it is received by the receiver of FIG. 1.
FIG. 2c shows an angle-modulated signal produced by the frequency window circuit shown in FIG. 1, as a function of time.

FIG. 2 shows graphs to illustrate the operation of the frequency window circuit 12.

FIG. 2a shows a frequency curve representing the bandwidth of the receiver 1. FIG. 2b shows a frequency-versus-time curve of the instantaneous frequency of the angle-modulated input signal. The bandwidth having cut-off values $f_1$, $f_2$ of the frequency window circuit 12 is located symmetrically around the central frequency $f_c$ and within the receiver bandwidth shown in FIG. 2a. FIG. 2c shows an enable signal $V_{13}$ as a functon of time, which signal is supplied from the terminal 13 and produced by the frequency window circuit 12. In the areas I the instantaneous frequency of the input signal is located between the cuf-off values $f_1$, $f_2$; accordingly, an enable signal is produced in these areas I by the level detector 14. This results in a frequency interference peak M due to multipath distortion and an associated amplitude minimum, not shown, detected in detector 9. The frequency interference peak in area I is therefore indeed detected as a multipath distortion. In the areas II the instantaneous frequency is located outside the frequency range from $f_1$ to $f_2$ of the frequency curve shown in FIG. 2a. On the one hand, as described already in the foregoing, this results in amplitude minima when located at the edges of the curve shown in FIG. 2a and in a frequency interference peak because of an increas in noise caused by a decrease of the signal-to-noise radio. The frequency interference peak detector 10 can easily be triggered by the noise increase, and the amplitude detector 9 by an amplitude minimum. However the absence of the enable signal in area II will inhibit triggering of the multipath detector 8 via terminal 13; consequently distortion is not erroneously detected as multipath distortion. Consequently, in those systems which receive weak signals with comparatively much noise and where in areas II this noise adds to the said increase of the noise either the limited bandwidth of the receiver 1, the detection of multipath distortion is significantly improved.

A still further improvement of the multipath distortion detection is accomplished when the receiver 1 is provided with a frequency window circuit 12 which includes a low-pass filter 15, ccnnected to the demodulator 6, which filter is connected in turn to the level detector 14. This cascade-arrangement has for its effet that the frequency curve shown in FIG. 2b is smoothed to some extent, whereby the noise sensitivity on detection of multipath distortion decreases still further and a further improvement of the reliability with which multipath distortion is determined is obtained. This is, for example, the case for frequency interference peak K. Because of the introduction of the frequency window circuit 12 frequency interference peak K would erroneously not be detected as multipath distortion, because this frequency interference peak briefly exceeds the frequency limit $f_2$. The use of the low-pass filter 15 causes as is shown on a larger scale in the inset, this frequency interference peak to be partly smoothed as illustrated by the broken-line curves, as a result of which the peak stays within the frequency window so that multipath distortion is correctly determined.

From the above description it will be apparent that it would be possible to control the instantaneous the thresholds of the level detectors in the AM detector 9 and in the frequency-interference peak detector 10, in dependence on the deviation of in the signal from the central frequency.

What is claimed is:

1. In a receiver having a receiving frequency band for angle-modulated signals in such frequency band, such receiver comprising a mixer for deriving an I.F. signal from a received signal, a demodulator for deriving a demodulated signal from such I.F. signal, and a multipath transmission detector for detecting multipath distortion of the received signal; the improvement characterized in that such receiver further comprises a frequency window circuit having an input coupled to either one of said mixer and said demodulator to receive the signal derived thereby and an output connected to said multipath detector, said frequency window circuit supplying at its output an enabling signal to said multipath detector when the derived signal at the input of said frequency window circuit corresponds to a received signal within a frequency window having a bandwidth narrower than and located in the receiving frequency band of the receiver; such enabling signal enabling said multipath detector to detect multipath distortion of the received signal.

2. A receiver as claimed in claim 1, wherein said frequency window circuit comprises a level detector having an input and an output which constitute the input and output, respectively, of said frequency window circuit; the input of said level detector being coupled to said demodulator to receive the demodulated signal derived thereby; said level detector producing said enabling signal at its output when the instantaneous amplitude of said demodulated signal falls between predetermined levels established by said level detector corresponding to the bandwidth of said frequency window.

3. A receiver as claimed in claim 2, wherein the input of said level detector is coupled to said demodulator by a low-pass filter which smooths frequency variations of the demodulated signal derived by said demodulator.

4. A receiver as claimed in claim 1, wherein said frequency window circuit comprises a bandpass filter and a level detector connected in series between the input and output thereof; said input being connected to said mixer to receive the I.F. signal derived thereby; said bandpass filter having a bandwidth corresponding to the bandwidth of said frequency window; said level detector producing said enabling signal at said output when the frequency of said derived I.F. signal is within the bandwidth of said bandpass filter.

* * * * *